United States Patent
Isenberg et al.

(10) Patent No.: US 7,380,248 B1
(45) Date of Patent: May 27, 2008

(54) QUEUE ALERTS

(75) Inventors: Miguel Isenberg, Paderborn (DE);
Bryan M. Cantrill, San Francisco, CA (US); Bart Smaalders, Menlo Park, CA (US); Joseph J. Bonasera, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 820 days.

(21) Appl. No.: 10/788,790

(22) Filed: Feb. 26, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................... 719/314; 719/318

(58) Field of Classification Search ............ 712/28–43, 712/200–207, 216–248; 718/100, 101–103, 718/106–108; 719/310–320, 328–332
See application file for complete search history.

(56) References Cited

U.S. PATENT DOCUMENTS

| | | | | |
|---|---|---|---|---|
| 5,727,214 A | * | 3/1998 | Allen | 719/318 |
| 6,223,207 B1 | * | 4/2001 | Lucovsky et al. | 718/107 |
| 6,631,363 B1 | * | 10/2003 | Brown et al. | 707/1 |
| 6,687,729 B1 | * | 2/2004 | Sievert et al. | 718/102 |
| 6,745,262 B1 | * | 6/2004 | Benhase et al. | 710/40 |
| 6,901,596 B1 | * | 5/2005 | Galloway | 719/330 |
| 7,051,330 B1 | * | 5/2006 | Kaler et al. | 718/106 |
| 7,061,858 B1 | * | 6/2006 | Di Benedetto et al. | 370/219 |
| 2003/0055768 A1 | * | 3/2003 | Anaya et al. | 705/36 |
| 2007/0168991 A1 | * | 7/2007 | Greenberg et al. | 717/127 |

OTHER PUBLICATIONS

Bhattacharya, Design Notes on Asynchronous I/O (aio) for Linux, IBM Software Labs, India, Jan. 30, 2002, pp. 1-22.*

* cited by examiner

*Primary Examiner*—William Thomson
*Assistant Examiner*—Diem K Cao
(74) *Attorney, Agent, or Firm*—Darby & Darby PC; John W. Branch

(57) ABSTRACT

Methods and apparatus, including computer program products, implementing and using techniques for alerting one or more computer software application threads waiting to retrieve events from an event port. An alert event generated by a computer software application is received at the event port. A state of the event port is changed to an alert state, if the event port is not already in an alert state, in response to receiving the alert event. One or more of the computer software application threads is notified about the alert state of the event port.

25 Claims, 5 Drawing Sheets

QUEUE ALERTS

BACKGROUND

Input and output (I/O) is an essential element of computer operating systems and refers to operations that occur between a computer and external devices, such as printers, storage devices, and other computers. I/O also refers to internal computer operations, such as communication between a processor in the computer and internal disks, memory, and so on.

There are two main categories of I/O: synchronous and asynchronous. In synchronous I/O, when an application calls an I/O operation, the application is suspended until the I/O operation is complete, which is typically signaled by an "interrupt" signal transmitted to the application that requested the I/O operation. In asynchronous I/O, on the other hand, when an application calls an I/O operation, the application is free to perform other tasks while the I/O is being completed. Asynchronous I/O is thus very useful in that it, for example, allows an application to read data being input from a keyboard, while writing data onto a computer screen, and maybe also reading data from a disk drive or memory.

Transactions typically refer to asynchronous read or write operations, as well as interactions between an application and a kernel that requires an asynchronous completion notification. The asynchronous completion notifications can generally be referred to as events.

In a computer operating system, whenever an event occurs, the event is placed in an event queue. Event queues can typically accommodate events generated from several disjoint sources, such as asynchronous I/O, timers, user-defined events, file descriptor events, and so on. Applications can access the event queues through event ports to retrieve events that are in the event queues. The event ports may be physical addresses on a computer or computer device, or mapped locations in the computer's memory. Event ports (and the corresponding event queues) are generally only created on demand.

Typically there is one event queue for every application thread. A thread generally refers to a part of an application program that can run independently and along with other threads to accomplish a task. A number of computer operating systems support multiple threads. Each thread shares the same address space, descriptors, and other resources within an application process, but has its own program counter for execution. A multi-threaded application process can be used for I/O operations that happen on the same descriptor or on different descriptors. Due to the high speed of processors, in a multi-threaded environment, several I/O operations often appear to occur simultaneously.

Occasionally situations occur where several threads or processes that are working on different tasks need to be triggered synchronously by another thread or process. A common way to achieve this is to use signals. However, signals come with a number of drawbacks, for example, signals carry little or no data from the sender of the signal to the receiver of the signal, a signal may interrupt the receiver of the signal in an undefined state, tasks that can be performed within a signal handler are limited, synchronization problems can arise because of user locks, and so on.

From time to time, there is also a need to synchronize several threads or processes, particularly when multiple processes compete for the same operating system resources. Conventionally, such synchronizations are performed using semaphore operations. A semaphore is a value in a designated place in an operating system (or kernel) storage that each process or thread can check and change. Depending on the value found when checking the semaphore, the process can either use the resource or will find that the resource is already in use and that the process must wait for some period before trying again. Semaphores can either be binary or have additional values. Typically, a process using a semaphore checks the value and then, if the process can use the resource, changes the value to reflect this so that subsequent threads or processes using the semaphore will know to wait. Waiting processes or threads cannot perform any tasks while they are waiting, so the use of semaphores may lead to noticeable performance degradation.

SUMMARY

In general, in one aspect, the invention provides methods and apparatus, including computer program products, implementing and using techniques for alerting one or more computer software application threads waiting to retrieve events from an event port. An alert event generated by a computer software application is received at the event port. A state of the event port is changed to an alert state, if the event port is not already in an alert state, in response to receiving the alert event. One or more of the computer software application threads is notified about the alert state of the event port.

Implementations can include one or more of the following features. The alert event can be retrieved from the event port by the notified one or more computer software application threads and each computer software application thread can be returned to its respective computer software application with the retrieved alert event. The alert event can include one or more flags and it can be determined whether the event port is in an alert state by checking one or more of the flags.

The event port can be changed from the alert state to a normal state. An error message can be generated if the event port cannot be changed to the normal state. An error message can be generated if the event port cannot be changed to the alert state. The error message can be generated in response to detecting one or more of: an invalid port identifier, an event port argument not being an event port file descriptor, an event port already being in alert mode, and mutually exclusive flags being set.

Data about the cause of the alert can be included in the alert event. A reference to data about the cause of the alert can be included in the alert event. Each computer software application thread can be returned to its respective computer software application with the retrieved alert event and information about the cause of the alert event. The alert event can be generated in response to, for example, one or more of the following actions: a signal occurring, a synchronization request being issued, a task waiting to be performed, and a command being issued for terminating all ongoing processes. However, it should be noted that these actions are just examples, and that there may be other actions that will cause an alert event to be generated. The event port can have an associated event queue, and the alert event can be placed and kept in the event queue until a request to remove the alert event is received. In general, in another aspect, the invention provides methods and apparatus, including computer program products, implementing and using techniques for alerting one or more computer software application threads waiting to retrieve events from an event port in a computer system. The apparatus includes an event queue, a request queue, and a queue manager. The event queue receives transaction events generated by one or more event sources and is accessible through an event port. The request queue holds requests to retrieve transaction events from the event queue. Each request has an associated priority that determines a place of the request in the request queue. The queue manager receives, at the event port, an alert event generated by a computer software application, changes a state of the event port to an alert state, if the event port is not already in an alert state, in response to receiving the alert event; and notifies one or more of the computer software application threads about the alert state of the event port.

The invention can be implemented to include one or more of the following advantages. Several threads or processes working on different tasks can be triggered almost synchronously by another thread or process, for example, if an emergency event occurs. The detection of the alerts can be asynchronous. Data can be carried in an alert from the alert sender to the alert receiver. The alert receiver is not interrupted in an undefined state. Synchronization problems due to user locks can be avoided. Several threads or processes can be synchronized while performing tasks, so performance degradations are avoided. Event generators can continue sending events to an event port, but as long as the event port is in an alert state only the alert event will be delivered in response to any requests. Alert events can be used to synchronize both threads and processes. Computer software applications can define different types of alert events as required.

The details of one or more embodiments of the invention are set forth in the accompanying drawings and the description below. Other features of the invention will be apparent from the description and drawings, and from the claims.

DESCRIPTION OF DRAWINGS

Like reference symbols in the various drawings indicate like elements.

DETAILED DESCRIPTION

The invention will be described in detail below by way of example with respect to asynchronous I/O completion notifications. It should however be noted that the principles described below are applicable to any type of event that can be sent to an event queue and retrieved from the event queue using an event port.

Figure 1:
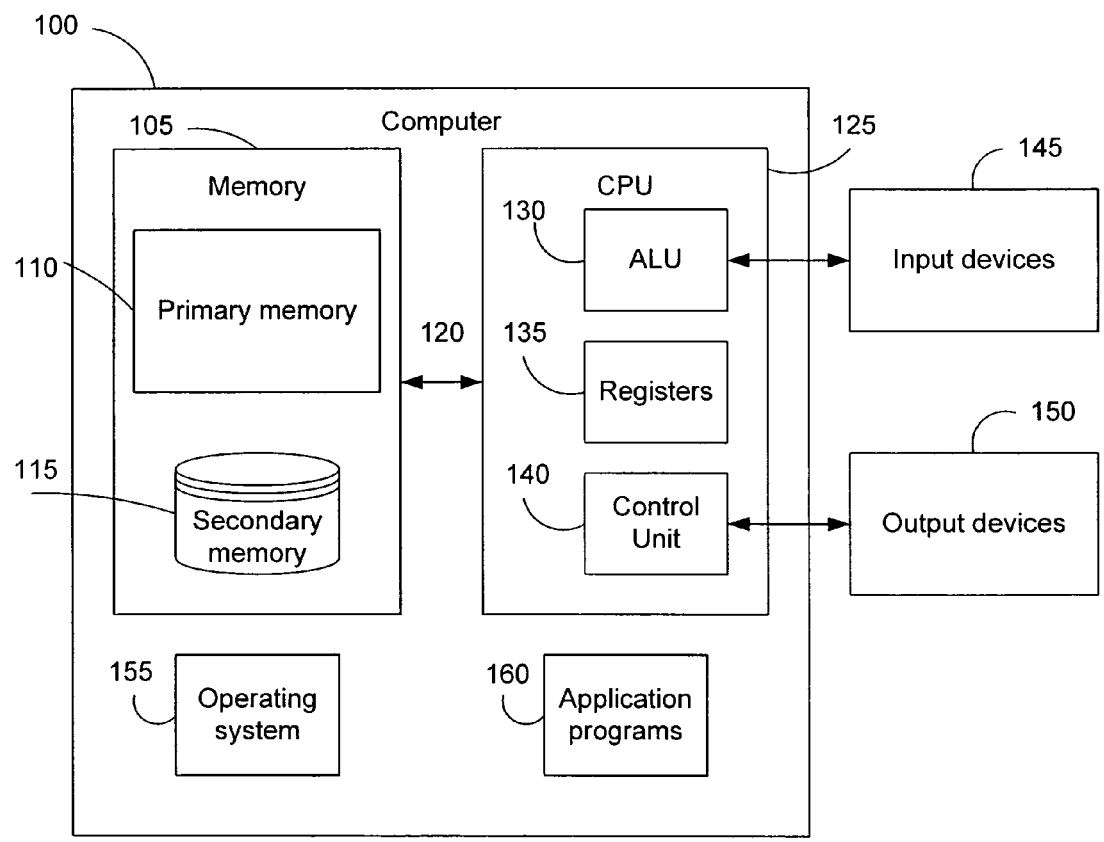
FIG. 1 shows a schematic block diagram of a computer connected to input and output devices, respectively.

FIG. 1 shows a schematic block diagram of a computer (100) that is connected to one or more input devices (145), such as a keyboard, a computer mouse, or a scanner. The computer (100) is also connected to one or more output devices (150), such as a display, and/or a printer. It should be noted that some devices, such as modems, can be used both as input and output devices. The computer (100) includes a memory (105), which has a primary memory component (110), such as a semiconductor RAM for short-term storage, and a secondary memory component (115), such as a ROM, magnetic or optical discs, flash memory, or tape, which is primarily used for long-term storage. As will be appreciated by those skilled in the art, the memory (105) can include a variety of other memory components. The computer (100) further includes a Central Processing Unit (CPU) (125), which has an Arithmetic logical unit (ALU) (130) for performing computations, registers (135) for temporary storage of data, and a control unit (140) for controlling operation of the computer (100). It should be noted that one or more components of the computer 100 can be located remotely and accessed through a network.

The computer (100) further includes an operating system (155) and one or more application programs (160). As will be appreciated by those skilled in the art, the operating system (155) can be described as software that controls the computer's (100) resource allocation, whereas the application programs (160) are software that performs tasks that are typically requested by a user, by using available operating system resources.

The invention can be used to alert one or more computer software application threads waiting to retrieve events from an event port. When an alert event generated by a computer software application thread is received at the event port, the state of the event port is changed to an alert state, if the event port is not already in the alert state, and one or more of the computer software application threads is notified about the alert state of the event port. The notified computer software application threads can then retrieve the alert event from the event port and return to their respective computer software applications with the retrieved alert event. The alert event can include one or more flags that can be checked to determine whether the event port is in an alert state.

At some later point in time, the event port can be changed back from the alert state to a normal state. If it for some reason is impossible to change the event port between the normal state and the alert state, an error message can be generated. Such situations can include when there is an invalid port identifier, an event port argument that is not an event port file descriptor, an event port that is already being in alert mode, and when there are mutually exclusive flags being set.

The alert event can include data about the cause of the alert, or a reference to data about the cause of the alert. Each computer software application thread can be returned to its respective computer software application with the retrieved alert event and information about the cause of the alert event. The alert event can, for example, be generated in response to one or more of the following actions: a signal occurring, a synchronization request being issued, a task waiting to be performed, and a command being issued for terminating all ongoing processes. The event port can have an associated event queue in which the alert event can be placed. The alert event can be kept in the event queue until a request to remove the alert event is received.

Figure 2:
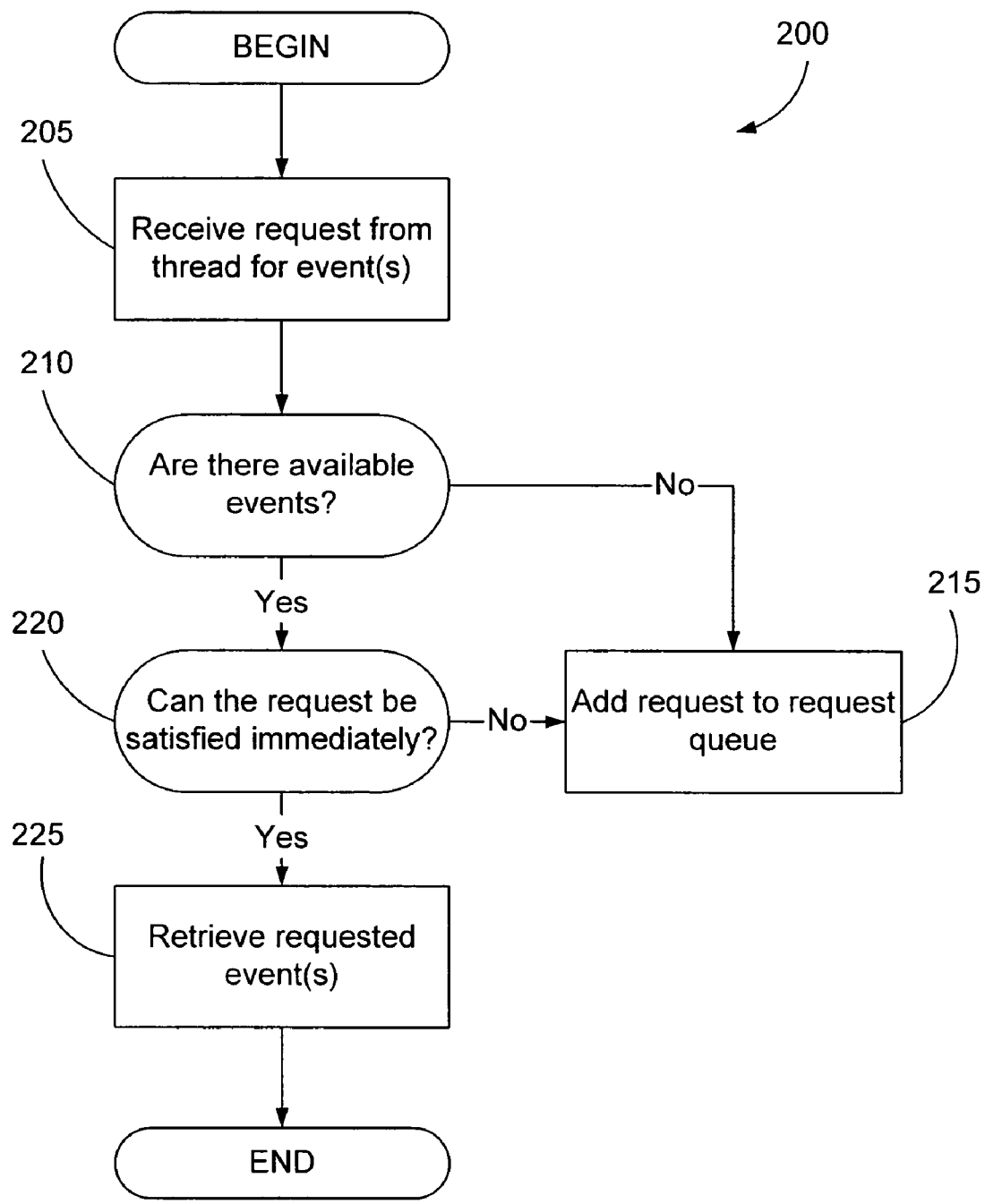
FIG. 2 shows a schematic flowchart of how an incoming request from a program application is processed.

FIG. 2 shows a process (200) for how an incoming request from a program application is processed. In FIG. 2, it is assumed that an event port is used to access an event queue, which is implemented as an internal FIFO (First In First Out) queue on the computer (100). It is further assumed that the program application has specified what event sources are permitted to post events, e.g., disjoint events, to the event port. The various event sources define the meaning of the events. For example, in the case of asynchronous I/O an event may mean that a transaction has been performed, in the case of a standard file descriptor an event may mean that data is available (POLLIN) or that a socket has been closed (POLLH UP), in the case of a timer an event may mean that a timer signal was generated, in the case of a signal an event may mean that a specific signal was sent to a process, and so on.

In order to retrieve events from the event port, application threads send out requests to the event port. In this example, an application thread is a unit of execution and a request is a request object that is sent to the event port. The requests are ordered internally in a request queue when an application thread needs to wait or block. As will be explained in further detail below, each request has a priority, which can be used to determine the processing order (i.e., a priority order) of the requests in the request queue. As will be appreciated by those skilled in the art, the process illustrated in FIG. 2 is equally well applicable to configurations with multiple event ports, which will typically be the case. The single event port/event queue model is only used herein for facilitating the explanation of the process.

As can be seen in FIG. 2, the process begins by receiving a request from a thread to retrieve one or more events (step 205). In one implementation, the request is made by a function port_get( ), which can retrieve a single event, or by a function port_getn( ), which can retrieve multiple events from an event port. Both of these functions will be described in further detail below. The process then checks whether there are any available events to retrieve (step 210) in the event queue. If there are no available events to retrieve, and it is desired that the request should wait until events become available, the process adds the request to a request queue (step 215), which will be explained in more detail below with reference to FIG. 3. The request queue is ordered in such a manner that the requests in the request queue can be retrieved at a later time as events become available in the event queue.

If the process detects in step 210 that there are available events, the process continues to examine whether the request can be satisfied immediately (step 220), that is, whether there is a sufficient number of available events at the event port to satisfy the request. If the request can be satisfied immediately, the process retrieves the requested events (step 225), and the fulfilled request returns to the application program that originally submitted the request. If the request cannot be satisfied immediately, the process adds the request to the request queue (step 215). As will be discussed in further detail below with regards to Table 2, the port_getn( ) function is called with two arguments, a desired number of events to be retrieved, and a maximum number of events. The requested number of events that is returned in step 225 above is the desired number of events in the port_getn( ) function. The maximum number of events, on the other hand, describes the limits of the memory space to which the retrieved events are sent, i.e., the largest number of events the requesting application can accommodate.

Figure 3:
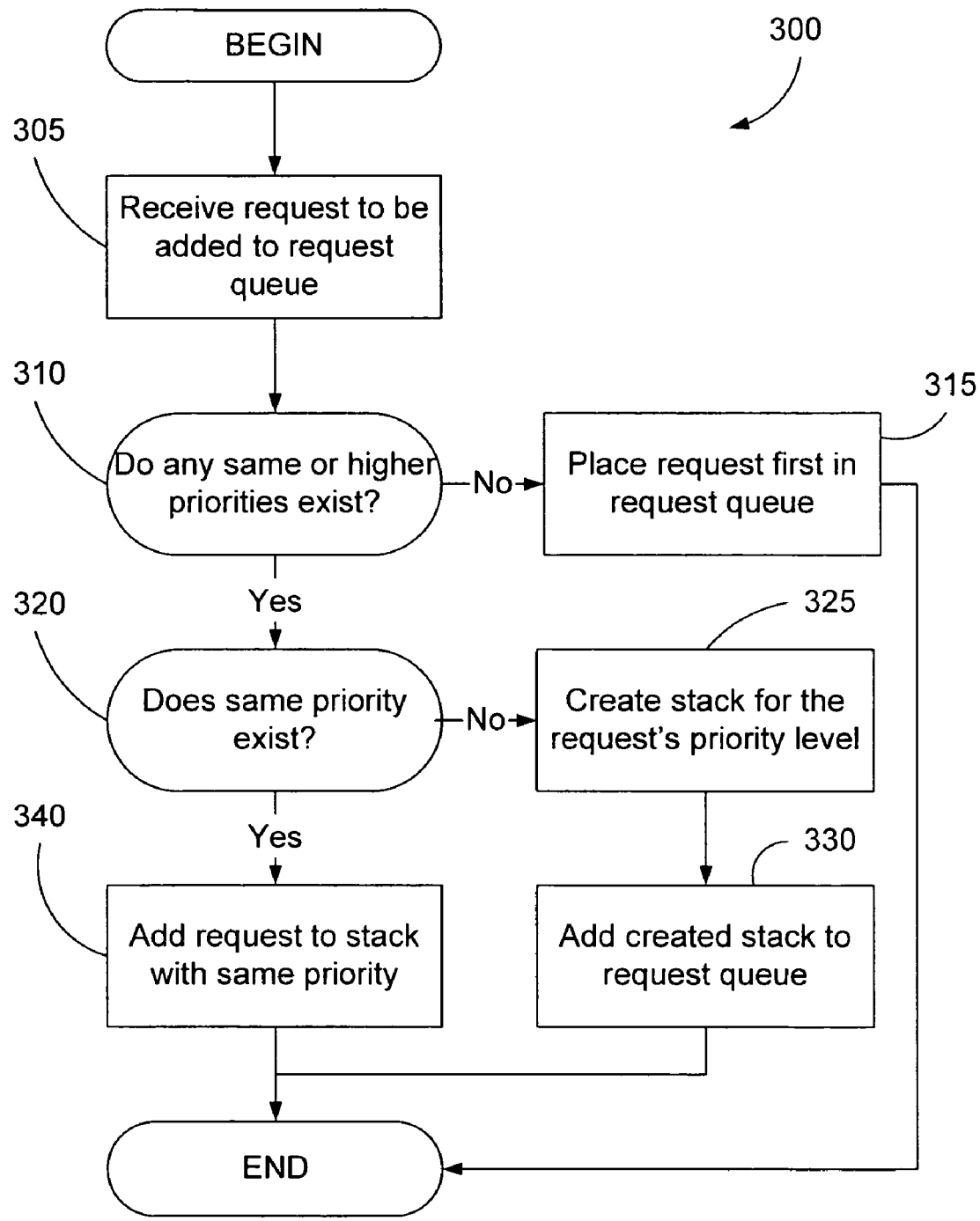
FIG. 3 shows a schematic flowchart of how requests are organized in the request queue (step 215 of FIG. 2).

FIG. 3 shows a more detailed view of step 215 of FIG. 2, that is, a process (300) for adding requests to the request queue. In one implementation, the global organization of the request queue is based on a priority level for each request. A higher priority means a request for fewer events, such that the request can be satisfied faster. If there are multiple requests with the same priority, these same priority requests are organized internally as a stack, that is, a LIFO (Last In First Out) queue.

As can be seen in FIG. 3, a request to be added to the request queue is received (step 305). In order to find the proper position for the request in the request queue, the process checks whether there are already any waiting requests in the request queue that have a same or higher priority (step 310). If there are no requests in the request queue with same or higher priorities, i.e., if there are only requests waiting for more events than the received request, the request is placed first in the request queue (step 315) and the process ends.

However, if same or higher priority requests exist in the request queue, the process examines whether there are any requests in the request queue with the same priority (step 320). If there are no requests with the same priority in the request queue, the process creates a new stack for the priority level of the request (step 325) and adds the request to the stack. The newly created stack is then added to the request queue (step 330), and the process ends. If, on the other hand, the process determines in step 320 that there is already one or more requests in the request queue with the same priority, then the request is added to the stack of requests with the same priority (step 340), and the process ends.

As can be seen, this process guarantees that the request queue is ordered such that the highest priority requests are always placed in the front of the request queue, regardless of which application thread(s) issued the requests. Furthermore, all the waiting requests share the same request queue, regardless of to which application thread they belong.

In one implementation, the application threads also have the option to set a timeout for a request. If the timeout for a particular request expires while the request is waiting in the request queue, then the thread returns with a timeout notification to the application that originated the request, and with as many events as possible from the event port. In one implementation, if the requested number of events equals zero, then the port_getn( ) function does not retrieve any events, but instead informs the querying application about the number of available events in the event queue.

Figure 4:
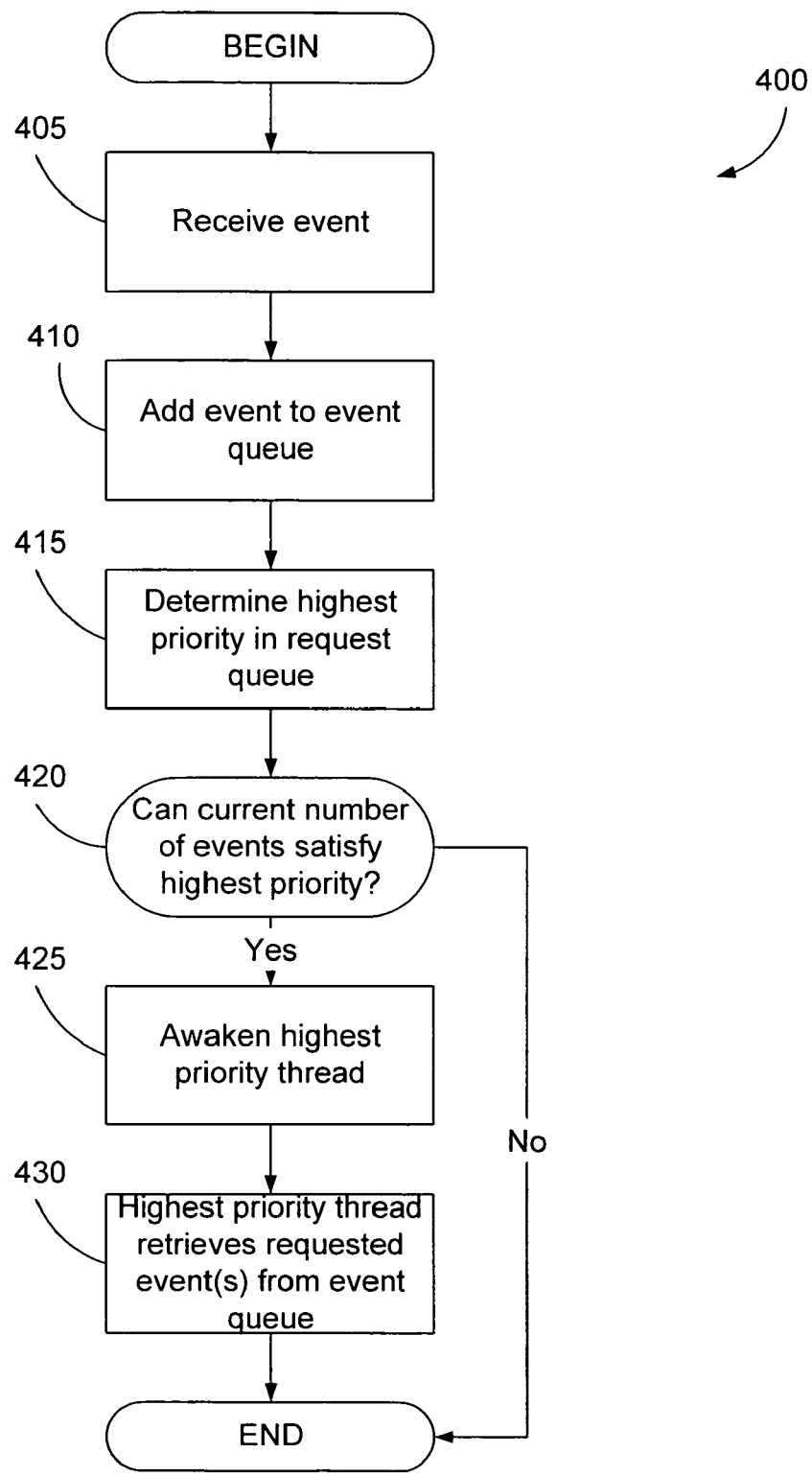
FIG. 4 shows a schematic flowchart of how an incoming event is processed when there are program application requests waiting for one or more events.

FIG. 4 shows a process (400) for how a processed event is handled when there are program application requests in the request queue waiting for one or more processed events. As can be seen in FIG. 4, a processed event is received (step 405). This processed event can, for example, be the completion of a disk I/O transaction (read or write transaction), a timer signals, data becomes available for reading from a socket, another thread or process sends a user-defined event to the event queue, and so on. When the processed event is received, the process adds the received event to the event queue, which is a FIFO queue (step 410). The process then determines the highest priority of the waiting requests in the request queue (step 415). This step is relevant and is preferably executed as fast as possible. The organization of the request queue that was described above facilitates this step, in that the process only needs to check the first request in the request queue, since the highest priority requests are always placed in the beginning of the request queue.

When the process has determined which request has the highest priority, the process checks whether the requested number of events in the highest priority request can be satisfied by the number of available events in the event queue (step 420). If the highest priority request cannot be satisfied, then the process leaves the event in the event queue and ends without further actions, and the process is repeated from the beginning when a subsequent event is received.

If the process determines in step 420 that the highest priority request can be satisfied, then the highest priority thread is "awakened," i.e., marked as runable, from its waiting state in the request queue (step 425). In a situation where there are multiple requests with the same highest priority (i.e., when there is a stack of requests with the same priority), the highest priority request that is on top of the stack is awakened. The awakened highest priority thread then retrieves the requested event(s) from the event queue (step 430), and the process ends.

Retrieving the requested events from the event queue may take a long time, in particular if the number of events is large, such as several thousands of events. In one implementation, any incoming events during this retrieval time are put in the event queue without further actions until the thread has received all its events. When the thread returns with its retrieved events, the thread checks if another request of the same priority, or of a next lower priority, can be satisfied immediately. If the next request can be satisfied immediately, the thread proceeds to awake this next request before returning to its application.

As was described above, in one implementation, the events are retrieved from the event port(s) by one of two functions port_get( ) and port_getn( ), respectively. The application threads call these functions. The port_get( ) function can retrieve a single event and the port_getn( ) function can retrieve multiple events. The port_get( ) function returns an integer and is called with the arguments shown in Table 1 below:

TABLE 1

| Argument | Type | Comments |
|---|---|---|
| port | int | Port address from which events are to be retrieved |
| *pe | port_event_t | Pointer to an uninitialized port_event_t structure that is filled in by the system when the port_get( ) function returns successfully. The port_event_t structure contains the following members:<br>portev_events; /* detected events */<br>portev_source; /* event source */<br>portev_object; /* specific to event source */<br>*portev_user; /* user defined cookie */<br>The portev_events and portev_object arguments are specific to the event source. The portev_events denotes the delivered events. The portev_object refers to the associated object. The portev_source argument specifies the source of the event. The portev_user argument is a user-specified value. |
| *timeout | const timespec_t | Pointer to a timeout value that specifies how long a request should wait before timeout occurs. If the timeout pointer is NULL, the port_get( ) function blocks until an event is available. To poll for an event without waiting, timeout should point to a zeroed timespec. A non-zeroed timespec specifies the desired time to wait for events. The port_get( ) function returns before the timeout elapses if an event is available, a signal occurs, a port is closed by another thread, or the port is in or enters alert mode. |

The port_getn( ) function returns an integer and is called with the arguments shown in Table 2 below:

TABLE 2

| Argument | Type | Comments |
|---|---|---|
| port | int | Port address from which events are to be retrieved |
| list[ ] | port_event_t | Array of uninitialized port_event_t structures (see Table 1 above) that is filled in by the system when the port_getn( ) function returns successfully. |
| max | uint_t | The maximum number of events that can be returned in list[ ]. If max is 0, the value pointed to by nget (see below) is set to the number of events available on the port. The |

TABLE 2-continued

| Argument | Type | Comments |
|---|---|---|
| | | port_getn( ) function returns immediately but no events are retrieved. |
| *nget | uint_t | A pointer to the desired number of events to be retrieved. On return, the value pointed to by nget is updated to the actual number of events retrieved in list[ ]. Internally, the content of *nget can be used to prioritize the threads or processes that are waiting for events, as was discussed above. |
| *timeout | const timespec_t | Pointer to a timeout value that specifies how long a request should wait before timeout occurs. If the timeout pointer is NULL, the port_get( ) function blocks until an event is available. To poll for an event without waiting, timeout should point to a zeroed timespec. A non-zeroed timespec specifies the desired time to wait for events. The port_get( ) function returns before the timeout elapses if an event is available, a signal occurs, a port is closed by another thread, or the port is in or enters alert mode. |

The port_getn( ) function waits until the desired number of events is available, the timeout elapses, a signal occurs, an event port is closed by another thread, or the event port is in or enters alert mode. The alert mode is indicated by the existence of an alert event in the event queue, and causes all requests waiting in the request queue to return immediately to their respective applications (regardless of the number of events requested or any associated timeouts) with the alert event.

The port_get( ) and the port_getn( ) functions ignore non-shareable events generated by other processes. Upon successful completion, the value 0 is returned. Otherwise, the value −1 is returned and the error identifier "errno" is set to indicate the type of error. A list of the different types of errors that may occur in one implementation of the invention is presented below in Table 3. As the reader skilled in the art will realize, other types of errors may occur, depending on the system environment in which the functions are implemented.

TABLE

| Error identifier | Applicable function | Comments |
|---|---|---|
| EBADF | port_get( ) and port_getn( ) | The port identifier is not valid. |
| EBADFD | port_get( ) and port_getn( ) | The port argument is not an event port file descriptor. |
| EFAULT | port_get( ) and port_getn( ) | Event or event list cannot be delivered (list[ ] pointer and/or user space reserved to accommodate the list of events is not reasonable), or the timeout argument is not reasonable. |
| EINTR | port_get( ) and port_getn( ) | A signal was caught during the execution of the function. |
| EINVAL | port_get( ) and port_getn( ) | The timeout element tv_sec or tv_nsec is <0 or >1000000000. |
| ETIME | port_get( ) and port_getn( ) | The time interval expired before the expected number of events has been posted to the port. |
| EINVAL | port_getn( ) | The list[ ] argument is NULL, the nget argument is NULL, or the content of nget is > max and max is > 0. |

TABLE-continued

| Error identifier | Applicable function | Comments |
|---|---|---|
| EFAULT | port_getn( ) | The timeout argument is not reasonable. |
| ETIME | port_getn( ) | The time interval expired before the expected number of events has been posted to the port (original value in nget), or nget is updated with the number of returned port_event_t structures in list[ ]. |

EXAMPLE port_get( )

Table 4 below shows an example of an event port being created, a user event (PORT_SOURCE_USER) being sent to the event port and being retrieved with port_get( ), followed by the event port being closed. The portev_user and portev_events members of the port_event_t structure are the same as the corresponding user and events arguments of the standard port_send(3C) function.

TABLE 4

```
#include port.h>
    int         myport;
    port_event_t pe;
    struct timespec timeout;
    int         ret;
    void        *user;
    uintptr_t   object;
    myport = port_create( );
    if(myport < 0) {
      /* port creation failed . . . */
      . . .
      return( . . . );
    }
    . . .
    events = 0x01;        /* own event definition(s) */
    object = <myobject>;
    user = <my_own_value>;
    ret = port_send(myport, events, object, user);
    if (ret == -1) {
      /* error detected . . . */
      . . .
      close(myport);
      return ( . . . );
    }
/*
 * The following code could also be executed in another thread or
 * process.
 */
    timeout.tv_sec = 1; /* user defined */
    timeout.tv_nsec = 0;
    ret = port_get(myport, &pe, &timeout);
    if (ret == -1) {
      /*
       * error detected :
       * - EINTR or ETIME : log error code and try again . . .
       * - Other kind of errors : may have to close the port . . .
       */
      return( . . . );
    }
/*
 * After port_get( ) returns successfully, the port_event_t structure
   will be filled with:
 * pe.portev_source = PORT_SOURCE_USER
 * pe.portev_events = 0x01
 * pe.portev_object = <myobject>
```

TABLE 4-continued

```
 * pe.portev_user = <my_own_value>
 */
    . . .
    close(myport);
```

EXAMPLE port_getn( )

Table 5 below shows an example of an event port being created, ten user events being sent to the event port and being retrieved with port_getn( ), followed by the event port closing. A loop counter is used as events for the user-defined events. The user pointer is the same for all generated events. The timeout feature is also illustrated in the example below. As can be seen in Table 5, if a timeout occurs, the function checks to see if any events could be retrieved from the event port and, if no events could be retrieved, closes the event port and returns an error.

TABLE 5

```
#include <port.h>
/*
 * port_getn( )
 * submit 10 user-defined events to a port. Use port_getn( ) to retrieve
 * that number of events. Use the loop counter as events for the used-
    defined
 * events. The user pointer is the same for all generated events.
 */
#define MAX_EVENTS 10
void
port_getn( )
{
    port_event_t *pev;
    port_event_t evlist[ MAX_EVENTS];
    struct   timespec timeout;
    int      error;
    int      port;
    int      events;
    int      *user;
    uint_t   nget;
    uint_t   max;
    uint_t   index;
    user = (void *)0xbadface;
    port = port_create( );
    if(port == -1) {
      error = errno;
      printf("Can not create a port: errno = %d\n", error);
      return;
    }
    /* send user-defined events to the port */
    for (nget = 0; nget < MAX_EVENTS; nget++) {
      events = nget; /* example */
      error = port_send(port, events, user);
      if (error) {
        printf("port_send( ) returns error\n");
        (void) close (port);
        return;
      }
    }
    /* Use port_getn( ) to retrieve events */
    timeout.tv_sec = 0;
    timeout.tv_nsec = 10;
    nget = MAX_EVENTS;
    max = MAX_EVENTS;        /* example */
    error = port_getn(port, evlist, max, &nget, &timeout);
    if (error == -1) {
      if (errno != ETIME)) {
        perror("port_getn( ) failed:");
        (void) close (port);
        return;
      } else {
```

TABLE 5-continued

```
/*
 * timeout happens . . . check if some valid events
 * could be retrieved.
 */
    if(nget == 0) {
      /* no events retrieved */
      perror("port_getn( ) failed:");
      (void) close (port);
      return;
    }
    /* some events retrieved . . . ignore timeout, continue */
  }
}
if (nget != MAX_EVENTS) {
  printf("port_getn( ) returns less events . . . (%d)\n",nget);
  (void) close (port);
  return;
}
/*
 * A loop here could check the event type to distribute the events
 * to other threads/functions . . .
 */
  . . .
  /* check events field */
  for (index = 0; index < nget; index++) {
    pev = &evlist[ index];
    if ((pev->portev_events != index) ||
        (pev->portev_user != user)) {
      printf("Wrong event data detected\n");
      (void) close (port);
      return;
    }
  }
  /* everything is ok */
  (void) close(port);
}
```

As was described above, event ports can enter alert states. An alert state is entered when an application sends an alert event to the event queue. In one implementation, the alert events are sent (and subsequently removed) using a port_alert( ) function, which will be described in further detail below. The alert events are generated by an application on the computer system in response to some type of event that occurs, such as a signal occurring, a new synchronization request being issued, a new task waiting to be performed, a command being issued for terminating all current processes, and so on. In one implementation, the alert event typically contains a pointer to some data, such that application threads or processes that return with the alert event when using the port_get( ) or port_getn( ) functions can obtain additional information about the cause of the alert.

When an alert event is sent to an event queue, the alert event is placed on top of the event queue, regardless of the contents of the event queue at the time the alert event arrives. The alert event remains in this position in the queue until the alert event is removed by the same thread that issued the alert event, or by some other thread, using the port_alert( ) function, as will be discussed below. As soon as an alert event arrives in the event queue, all the threads in the request queue that are waiting for conventional events will retrieve the alert event as a single event, regardless of how many events the respective threads are waiting for, and return to their respective applications with the alert event only.

When an alert event resides in the event queue, that is, when the event queue is in an "alert state," regular events will be sent to the event queue just like before the arrival of the alert event. However, these regular events will be placed at the end of the event queue and will not be visible or accessible to waiting threads or processes in the request queue until the alert event has been removed from the event queue.

A more detailed description of the port_alert( ) function will now follow. The port_alert( ) function returns an integer and is called with the arguments shown in Table 6 below:

TABLE 6

| Argument | Type | Comments |
| --- | --- | --- |
| Port | Int | Port address from which events are to be retrieved |
| Flags | Int | Flags indicating alert status. Can be set to PORT_ALERT_SET, or to PORT_ALERT_UPDATE and will be described in further detail below. |
| Events | Int | Events triggering the alert. As described above, an application defines the meaning of an alert event or alert type. The application thus defines the Events argument. In one implementation, a zero value of the Events argument is used to remove an alert from the event queue, and any non-zero value can be used to designate an event. |
| *user | pointer | This argument is also defined by an application and is typically a pointer to a data field or some application-specific data structure. |

As was discussed above, the port_alert( ) function transitions an event port into or out of alert mode. An event port in alert mode immediately awakens all threads blocked in port_get( ) or port_getn( ), i.e., the threads that have requests waiting in the request queue. The awakened threads return with an alert notification, which includes a single port_event_t structure with the source PORT_SOURCE_ALERT. Subsequent threads trying to retrieve events from an event port that is in alert mode return immediately with the alert notification.

Figure 5:
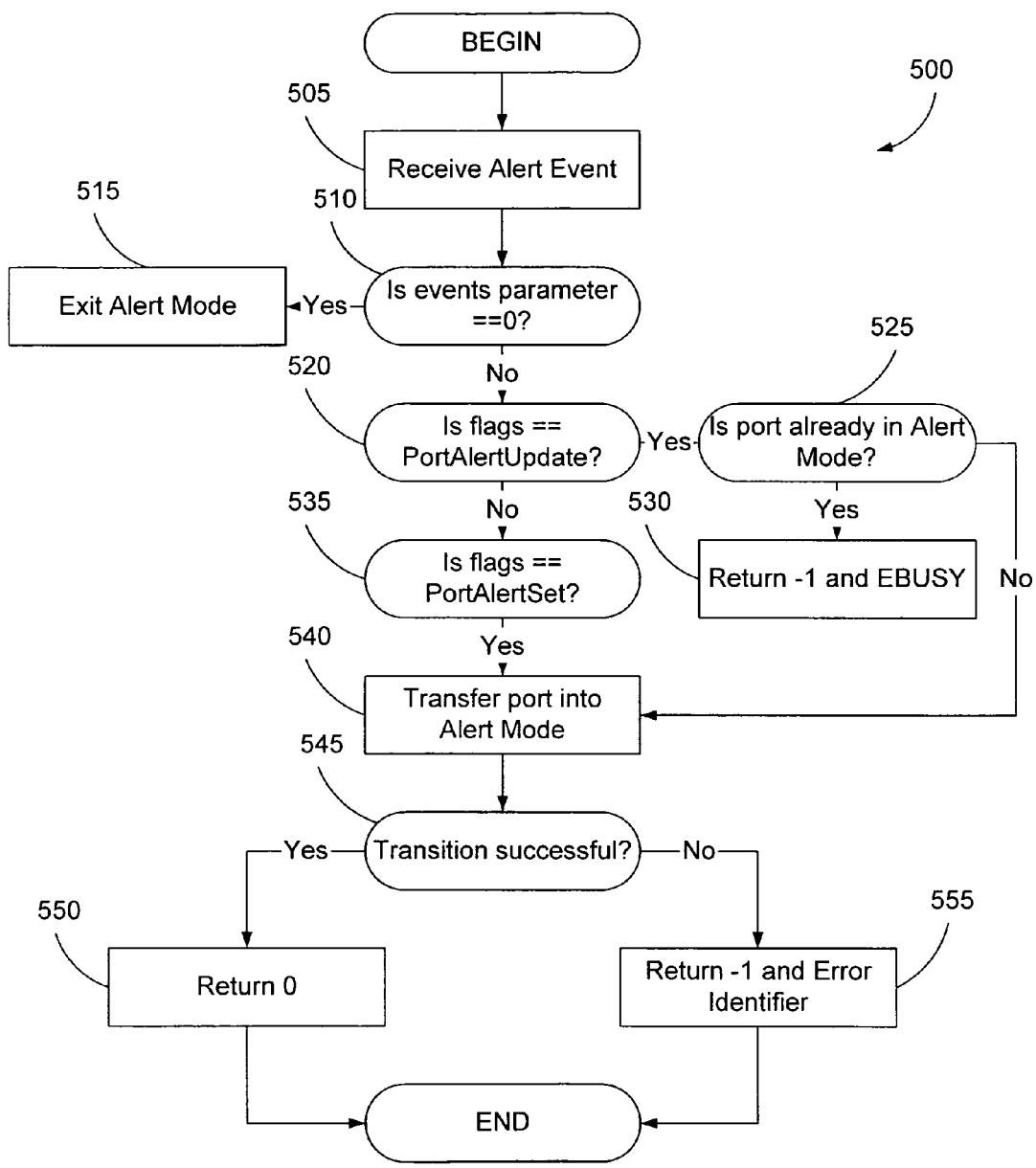
FIG. 5 shows how an event port enters or leaves an alert state.

FIG. 5 shows a process (500) for transferring an event port into or out of alert mode. As can be seen in FIG. 5, the process starts by receiving an alert event (step 505) as a result of an application calling the port_alert( ) function. The process then checks the events parameter, portev_events, of the port_alert( ) function (step 510) to examine whether the events parameter equals zero. If it is determined in step 510 that the events parameter equals zero, this means that the event port should be transitioned out of alert mode, which occurs in step 515.

If it is determined in step 510 that the event parameter is not equal to zero, the process checks the flags argument. The flags argument determines the mode of operation of the alert mode as follows. First the process checks whether the flags argument is set to PortAlertUpdate (step 520). If the flags argument is set to PortAlertUpdate, the process checks whether the event port is already in alert mode (step 525). If the event port indeed is in alert mode, an error has occurred and the process returns with the value −1 and the error message EBUSY, which per Table 6 below indicates that the event port is already in an alert mode (step 530). However if the event port is not in an alert mode, the process moves on to transfer the event port into alert mode (step 540).

Returning now to step 520, if it is determined that the flags argument is not set to PortAlertUpdate, the process checks whether the flags argument is set to PortAlertSet (step 535). If the flags argument is set to PortAlertSet, the process proceeds to step 540 and sets the event port in alert mode, regardless of the current state of the event port. The portev_events and portev_user members are set or updated accordingly. As should be clear from the above discussion, the flags settings PortAlertSet and PortAlertUpdate are mutually exclusive. In one implementation, when an event port is in an alert mode, events can still be queued to the event port, but the queued events are not retrievable until the event port is transitioned out of alert mode.

When the process has transitioned the event port into port alert mode, the process checks whether the transition was successful (step 545). If the transition was successful, the process returns the value zero (step 550), and otherwise the process returns the value −1 along with an error message (step 555), to the application that issued the alert, which ends the process (500). A list of the different types of errors that may occur in one implementation of the invention is presented below in Table 7.

TABLE 7

| Error identifier | Comments |
| --- | --- |
| EBADF | The event port identifier is not valid. |
| EBADFD | The event port argument is not an event port file descriptor. |
| EBUSY | The event port is already in alert mode |
| EINVAL | Mutually exclusive flags are set. |

EXAMPLE port_alert( )

Table 8 below shows an example of how alert events can be used with the port_alert( ) function. An event port is created and a user-defined event is sent to the event port by a first thread using the port_send( ) function. An alert event is then sent to the event port by a second thread using the port_alert( ) function. A third thread then attempts to retrieve events from the event port, checks if the retrieved event is an alert event. If the retrieved event is an alert event, the alert elements are examined. The alert event is subsequently removed from the event queue, and a thread checks to see whether the alert event indeed has been removed and whether the user event is still present. If the user event is still there, the user event is retrieved and examined.

TABLE 8

```
void
port_alert_example( )
{
    port_event_t    pev;
    struct  timespec    timeout;
    int     error;
    int     port;
    int     events;
    int     *user;
    /* Create a port */
    port = port_create( );
    if (port == −1) {
        perror("Can not create a port: ");
        return;
    }
    /* send user-defined event to the port */
    events = 0;                 /* user-defined value */
    user = (void *) −1;         /* user-defined value */
    error = port_send(port, events, user);
    if (error != 0) {/* error detected */
        perror("port_send( ) error: ");
        close(port);
        return;
    }
    /* send an alert event to the port */
```

TABLE 8-continued

```
    events = 1;                 /* user-defined value */
    user = (void *)2;           /* user-defined value */
    error = port_alert(port, PORT_ALERT_SET, events, user);
    if (error) {/* error detected */
        perror("port_alert( ) error ");
        close(port);
        return;
    }
    timeout.tv_sec = 1;
    timeout.tv_nsec = 0;
    /* retrieve event from the port */
    error = port_get(port, &pev, &timeout);
    if (error) {
        perror("port_get( ) error ");
        close(port);
        return;
    }
    /* Check if the retrieved event is an alert event */
    if (pev.portev_source != PORT_SOURCE_ALERT) {
        printf("wrong event source detected (!= alert)\n");
        close(port);
        return;
    }
    /* Check alert event elements */
    if ((pev.portev_events != events) ||
        (pev.portev_user != user)) {
        printf("port_get( ):wrong data returned!\n");
        close(port);
        return;
    }
    /* remove alert event/mode */
    error = port_alert(port, PORT_ALERT_SET, 0, NULL);
    if (error) {/* error detected */
        perror("port_alert error: ");
        close(port);
        return;
    }
    /* check if alert event is removed and the user event is still there */
    timeout.tv_sec = 1;
    timeout.tv_nsec = 0;
    events = 0;
    user = (void *) −1;
    /* retrieve event */
    error = port_get(port, &pev, &timeout);
    if (error) {
        perror("port_get( ) error: ");
        close(port);
        return;
    }
    /* Check user event */
    if (pev.portev_source != PORT_SOURCE_USER) {
        printf("wrong event source detected (!= user)\n");
        close(port);
        return;
    }
    if ((pev.portev_events != events) ||
        (pev.portev_user !=user)) {
        printf("port_get( ):wrong data returned!\n");
        close(port);
        return;
    }
    (void)close(port);
}
```

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. For example, the steps of the invention can be carried out in a different order. An additional counter can be defined as an argument to the port_alert( ) function, which specifies how many threads should get the alert notification before the alert event is removed automatically from the event queue. An alternative use of such a counter can be, for example, to have a counter value of zero indicate the use that has been described above, a counter value of 'n' denoting the number of threads or processes that should be alerted before the alert event is automatically removed, or a counter value of negative one denoting that the alert event should only be sent to the threads or processes that are currently in the request queue waiting to retrieve events. Accordingly, other embodiments are within the scope of the following claims.

The invention claimed is:

1. In a computer system, a method for alerting one or more computer software application threads waiting to retrieve events from an event port, the method comprising:
   receiving, at the event port, an alert event generated by a computer software application;
   changing a state of the event port to an alert state, if the event port is not already in an alert state, in response to receiving the alert event;
   notifying one or more of the computer software application threads about the alert state of the event port; and
   returning at least one computer software application thread to its respective computer software application independent of each event that the at least one computer software application thread is waiting to retrieve.

2. The method of claim 1, further comprising:
   retrieving the alert event from the event port with the notified one or more computer software application threads; and
   returning each computer software application thread to its respective computer software application with the retrieved alert event.

3. The method of claim 2, wherein returning comprises:
   returning each computer software application thread to its respective computer software application with the retrieved alert event and information about the cause of the alert event.

4. The method of claim 1, wherein:
   the alert event includes one or more flags; and
   changing includes determining whether the event port is in an alert state by checking one or more of the flags.

5. The method of claim 1, further comprising:
   changing the event port from the alert state to a normal state.

6. The method of claim 5, further comprising:
   generating an error message if the event port cannot be changed to the normal state.

7. The method of claim 1, further comprising:
   generating an error message if the event port cannot be changed to the alert state.

8. The method of claim 7, wherein the error message is generated in response to detecting one or more of:
   an invalid port identifier, an event port argument not being an event port file descriptor, an event port already being in alert mode, and mutually exclusive flags being set.

9. The method of claim 1, further comprising:
   including in the alert event data about the cause of the alert.

10. The method of claim 1, further comprising:
    including in the alert event a reference to data about the cause of the alert.

11. The method of claim 1, wherein the alert event is generated in response to one or more of the following actions:
    a signal occurring, a synchronization request being issued, a task waiting to be performed, and a command being issued for terminating all ongoing processes.

12. The method of claim 1, wherein the event port has an associated event queue, further comprising:
    placing the alert event in the event queue; and
    keeping the alert event in the event queue until a request to remove the alert event is received.

13. A computer program product, stored on a machine-readable medium, comprising instructions operable to cause a computer to:
    receive, at the event port, an alert event generated by a computer software application;
    change a state of the event port to an alert state, if the event port is not already in an alert state, in response to receiving the alert event;
    notify one or more computer software application threads waiting to retrieve events from an event port about the alert state of the event port; and
    return at least one computer software application thread to its respective computer software application independent of each event that the at least one computer software application thread is waiting to retrieve.

14. The computer program product of claim 13, further comprising instructions to:
    retrieve the alert event from the event port with the notified one or more computer software application threads; and return each computer software application thread to its respective computer software application with the retrieved alert event.

15. The computer program product of claim 14, wherein the instructions to return comprises instructions to:
return each computer software application thread to its respective computer software application with the retrieved alert event and information about the cause of the alert event.

16. The computer program product of claim 13, wherein:
the alert event includes one or more flags; and
the instructions to change include instructions to determine whether the event port is in an alert state by checking one or more of the flags.

17. The computer program product of claim 13, further comprising instructions to:
change the event port from the alert state to a normal state.

18. The computer program product of claim 17, further comprising instructions to:
generate an error message if the event port cannot be changed to the normal state.

19. The computer program product of claim 13, further comprising instructions to:
generate an error message if the event port cannot be changed to the alert state.

20. The computer program product of claim 19, wherein the error message is generated in response to detecting one or more of:
an invalid port identifier, an event port argument not being an event port file descriptor, an event port already being in alert mode, and mutually exclusive flags being set.

21. The computer program product of claim 13, further comprising instructions to:
include in the alert event data about the cause of the alert.

22. The computer program product of claim 13, further comprising instructions to:
include in the alert event a reference to data about the cause of the alert.

23. The computer program product of claim 13, wherein the alert event is generated in response to one or more of the following actions:
a signal occurring, a synchronization request being issued, a task waiting to be performed, and a command being issued for terminating all ongoing processes.

24. The computer program product of claim 13, wherein the event port has an associated event queue, further comprising instructions to:
place the alert event in the event queue; and
keep the alert event in the event queue until a request to remove the alert event is received.

25. An alert management apparatus for alerting one or more computer software application threads waiting to retrieve events from an event port in a computer system, comprising:
an event queue for receiving transaction events generated by one or more event sources, the event queue being accessible through an event port;
a request queue for holding requests to retrieve transaction events from the event queue, each request having an associated priority determining a place of the request in the request queue; and
a queue manager operable to:
receive, at the event port, an alert event generated by a computer software application;
change a state of the event port to an alert state, if the event port is not already in an alert state, in response to receiving the alert event;
notify one or more of the computer software application threads about the alert state of the event port; and
return at least one computer software application thread to its respective computer software application independent of each event that the at least one computer software application thread is waiting to retrieve.

* * * * *